US 10,651,457 B2

(12) United States Patent
Byun et al.

(10) Patent No.: US 10,651,457 B2
(45) Date of Patent: May 12, 2020

(54) BATTERY MODULE

(71) Applicant: SAMSUNG SDI CO., LTD., Yongin-si, Gyeonggi-do (KR)

(72) Inventors: Sang-Won Byun, Yongin-si (KR); Jeong-Won Oh, Yongin-si (KR); Sang-Kyoon Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 230 days.

(21) Appl. No.: 15/139,947

(22) Filed: Apr. 27, 2016

(65) Prior Publication Data

US 2017/0062795 A1 Mar. 2, 2017

(30) Foreign Application Priority Data

Aug. 26, 2015 (KR) .................. 10-2015-0120373

(51) Int. Cl.
*H01M 2/34* (2006.01)
*H01M 2/20* (2006.01)
*H01M 10/42* (2006.01)
*H01M 10/0525* (2010.01)

(52) U.S. Cl.
CPC ............ *H01M 2/345* (2013.01); *H01M 2/202* (2013.01); *H01M 10/0525* (2013.01); *H01M 10/4207* (2013.01); *H01M 10/4235* (2013.01)

(58) Field of Classification Search
CPC ............. H01M 2/202; H01M 10/0525; H01M 10/4207; H01M 10/4235; H01M 2200/103; H01M 2200/20; H01M 2/1016; H01M 2/345; H01M 2/348
See application file for complete search history.

(56) References Cited

U.S. PATENT DOCUMENTS

| 2011/0039147 | A1  | 2/2011 | Cheon et al. |
| 2011/0236742 | A1* | 9/2011 | Deng ............... H01M 2/26 429/121 |
| 2013/0059170 | A1* | 3/2013 | Kim ................. H01M 2/043 429/7 |
| 2013/0196179 | A1* | 8/2013 | Han ................. H01M 2/04 429/7 |

(Continued)

FOREIGN PATENT DOCUMENTS

| KR | 10-1072955 B1 | 10/2011 |
| KR | 10-2014-0064487 A | 5/2014 |

*Primary Examiner* — Carlos Barcena
(74) *Attorney, Agent, or Firm* — Lee IP Law, PC (57) ABSTRACT

A battery module includes a first rechargeable battery and a second rechargeable battery electrically coupled in series to each other, the first rechargeable battery and the second rechargeable battery each including a first electrode and a second electrode, and the first rechargeable battery and second rechargeable battery each including a short circuit member that deforms when an internal pressure of the respective one of the first rechargeable battery and second rechargeable battery exceeds a predetermined pressure, and a fuse member including a first pad electrically coupled to the second electrode of the second rechargeable battery, a second pad overlapping the short-circuit member of the second rechargeable battery, and a plurality of fuses formed between the first pad and the second pad, wherein widths of the fuses are smaller than widths of the first and second pads.

5 Claims, 6 Drawing Sheets

(56) References Cited

U.S. PATENT DOCUMENTS

2014/0139185 A1     5/2014  Han et al.
2014/0193675 A1*    7/2014  Kim ..................... H01M 2/345
                                                        429/61

* cited by examiner

BATTERY MODULE

CROSS-REFERENCE TO RELATED APPLICATION

Korean Patent Application No. 10-2015-0120373, filed on Aug. 26, 2015, in the Korean Intellectual Property Office, and entitled: "Battery Module," is incorporated by reference herein in its entirety.

BACKGROUND

1. Field

Embodiments relate to a battery module.

2. Description of the Related Art

A rechargeable battery differs from a primary battery in that it can be repeatedly charged and discharged, while the latter is incapable of being recharged. Low-capacity rechargeable batteries are used in small portable electronic devices such as mobile phones, notebook computers, and camcorders, while high-capacity rechargeable batteries can be used as a power source for driving motors of a hybrid vehicle, an electric vehicle, and the like.

The rechargeable battery may be used as a single cell as in small electronic devices, or may be used as a battery module in which a plurality of cells are electrically coupled as in power sources for driving a motor. In a rechargeable battery module, electrode terminals of unit cells are connected by a bus bar such that the unit cells are connected in series or in parallel.

SUMMARY

Embodiments are directed to a battery module including a first rechargeable battery and a second rechargeable battery electrically coupled in series to each other, the first rechargeable battery and the second rechargeable battery each including a first electrode and a second electrode, and the first rechargeable battery and second rechargeable battery each including a short circuit member that deforms when an internal pressure of the respective one of the first rechargeable battery and second rechargeable battery exceeds a predetermined pressure, and a fuse member including a first pad electrically coupled to the second electrode of the second rechargeable battery, a second pad overlapping the short-circuit member of the second rechargeable battery, and a plurality of fuses formed between the first pad and the second pad, wherein widths of the fuses are smaller than widths of the first and second pads.

The battery module may further include a first drawn-out tab connected to the first electrode of the first rechargeable battery and a second drawn-out tab connected to the fuse member.

The first rechargeable battery and second rechargeable battery each include an electrode assembly that includes a positive electrode and a negative electrode to perform charging and discharging operations, a case in which the electrode assembly is accommodated, and a cap plate combined to an opening of the case, the cap plate and the first electrode being electrically coupled to the positive electrode, and the second electrode being electrically coupled to the negative electrode.

The short-circuit member may further include an edge portion that is fixed inside a short-circuit hole that penetrates through the cap plate.

A border of the short-circuit hole may be located within a boundary defined by a border of the second pad.

The second pad may further include a protrusion that protrudes toward the short-circuit hole.

The electrode assembly may be spirally wound based on a winding axis.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
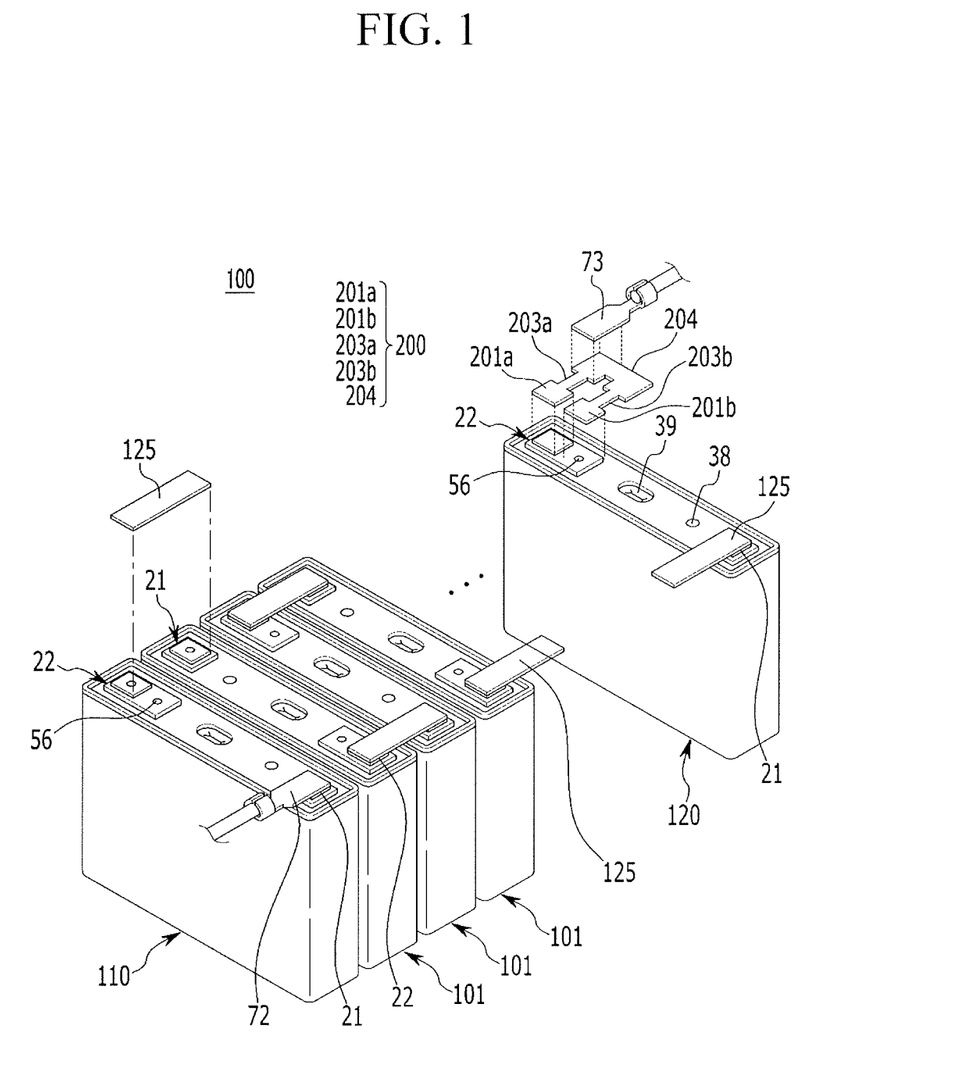
FIG. 1 illustrates a perspective view of a battery module according to an exemplary embodiment.

FIG. 1 illustrates a perspective view of a battery module according to an exemplary embodiment.

As shown in FIG. 1, the battery module 100 according to the current exemplary embodiment may include a plurality of rechargeable batteries 101 that are sequentially arranged. The battery module 100 may include a positive electrode and a negative electrode. The positive electrode and the negative electrode of the battery module 100 may be electrode terminals of rechargeable batteries 101 that are positioned at outmost sides of the plurality of rechargeable batteries 101 included in the battery module 100.

The plurality of rechargeable batteries 101 may be electrically connected in series, and may be arranged in one line. The rechargeable batteries 101 may be electrically connected in series by a plate-shaped connecting member 125. The connecting member 125 may be a long plate-shaped conductor. The connecting member 125 may electrically couple first and second terminals 21 and 22 of the rechargeable batteries 101 that neighbor each other. The first and second terminals 21 and 22 may have different polarities. For example, the second terminal may be a negative electrode terminal when the first terminal is a positive electrode terminal.

A first drawn-out tab 72 through which a current is drawn out may be provided in the first terminal 21, which is the positive electrode terminal of a rechargeable battery 110

(hereinafter referred to as a 'first rechargeable battery') positioned at one end of the serially connected rechargeable batteries 101. A second drawn-out tab 73 may be electrically coupled to the second terminal 22, which is the negative terminal of a rechargeable battery (hereinafter referred to as a 'second rechargeable battery') 120 positioned at the other end of the rechargeable batteries. In this case, the second drawn-out tab 73 may be electrically coupled to the second terminal 22 via a fuse member 200 that contacts the second terminal 22 to be connected thereto.

The first and second drawn-out tabs 72 and 73 may transmit the current to a device to which the battery module 100 is connected. The first and second terminals of the two of the plurality of rechargeable batteries included in the battery module, which form electrically opposite ends of the battery, may respectively constitute the positive and negative electrodes of the battery module when they are respectively connected to the first drawn-out tab 72 and the second drawn-out tab 73.

The rechargeable batteries included in the battery module of FIG. 1 will be described in detail with reference to FIGS. 2 to 4.

Figure 2:
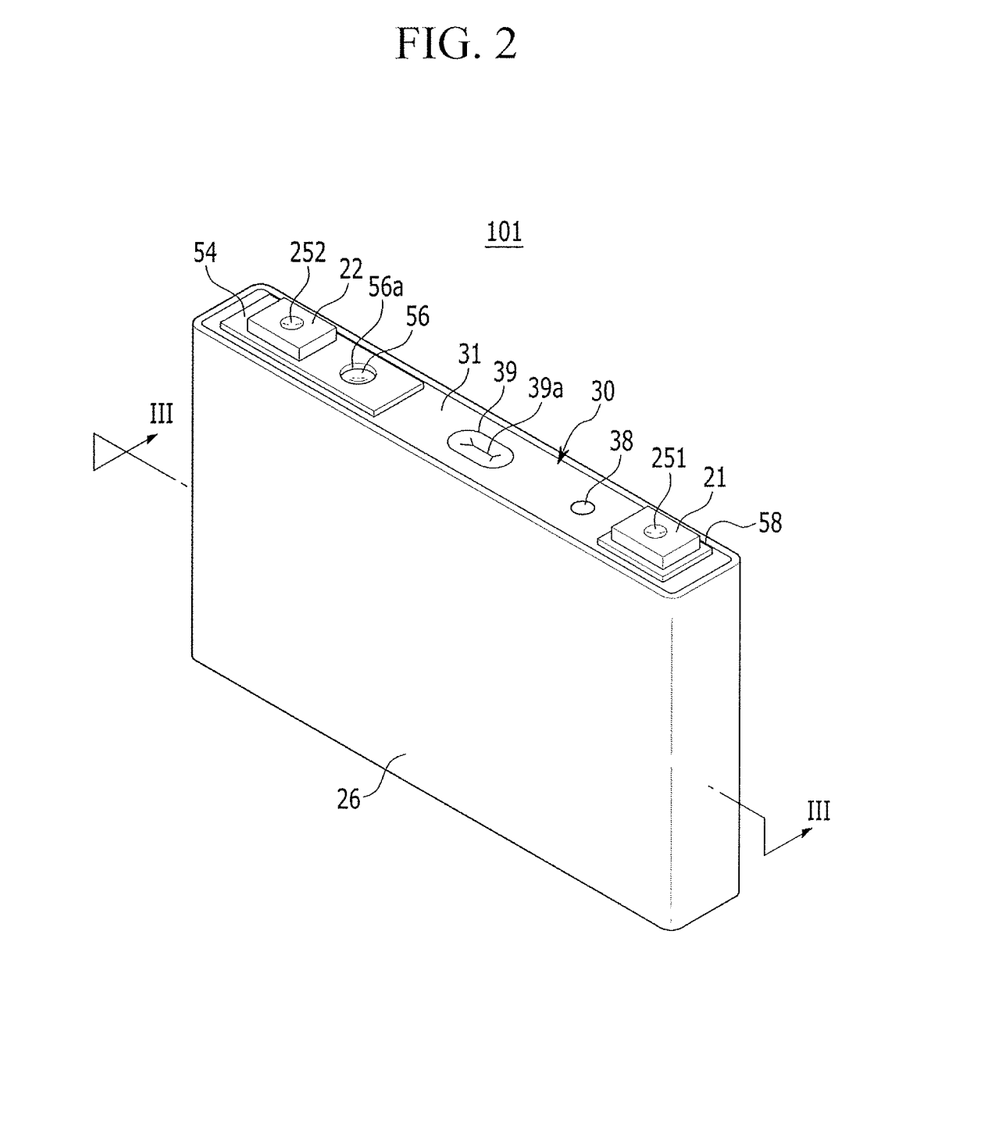
FIG. 2 illustrates a perspective view of one rechargeable battery included in the battery module illustrated in FIG. 1.
Figure 3:
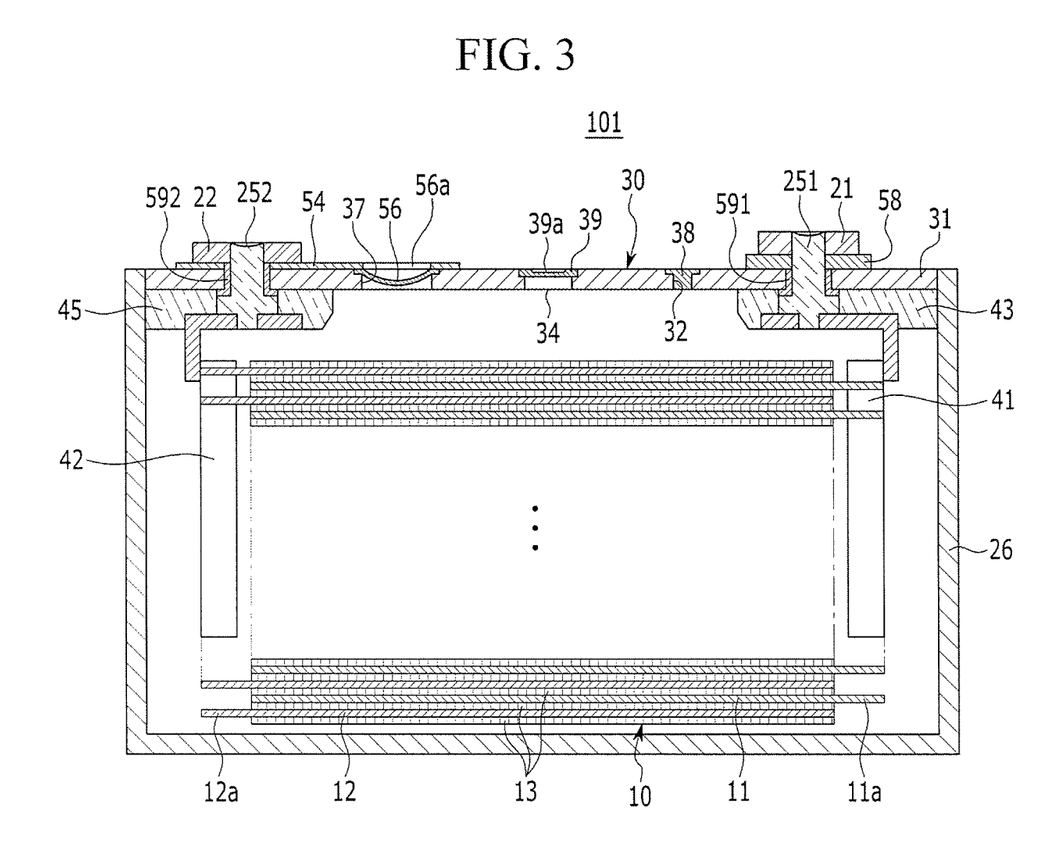
FIG. 3 illustrates a cross-sectional view of FIG. 2 taken along the line III-III.
Figure 4:
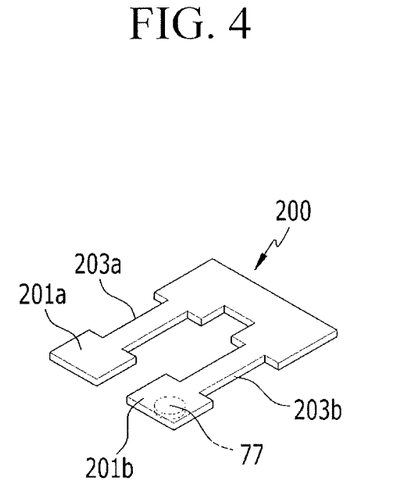
FIG. 4 illustrates a perspective view of a fuse member according to an exemplary embodiment.

FIG. 2 illustrates a perspective view of one rechargeable battery included in the battery module illustrated in FIG. 1, FIG. 3 illustrates a cross-sectional view of FIG. 2 taken along the line III-III, and FIG. 4 illustrates a perspective view of a fuse member according to the exemplary embodiment.

The rechargeable batteries included in the rechargeable battery module may have the same structure, so one rechargeable battery will be described as an example.

As shown in FIGS. 2 and 3, the rechargeable battery 101 according to the current exemplary embodiment includes: an electrode assembly 10 wound by interposing a separator 13 between a positive electrode (first electrode) 11 and a negative electrode (second electrode) 12; a case 26 in which the electrode assembly 10 is accommodated; and a cap assembly 30 combined to an opening of the case 26.

Embodiments may be applicable to various types of batteries such as a lithium polymer battery, a cylindrical battery, and the like. For example, the rechargeable battery 101 according to the current exemplary embodiment may be a lithium ion rechargeable battery having a prismatic shape.

The positive electrode 11 and the negative electrode 12 may include coated regions where an active material is coated on a current collector formed of a thin metal foil, and uncoated regions 11a and 12a where the active material is not coated thereon. The positive electrode uncoated region 11a may be formed at one lateral end of the positive electrode 11 along a length direction thereof, and the negative electrode uncoated region 12a may be formed at the other lateral end of the negative electrode 12 along a length direction thereof. The positive and negative electrodes 11 and 12 may be wound while interposing the separator 13 serving as an insulator therebetween.

In some implementations, the electrode assembly 10 may have a structure in which the positive and negative electrodes, each including a plurality of sheets, are layered, with the separator 13 interposed therebetween.

The case 26 may have a substantially cuboid shape, one surface of which may be formed with an opening. The case 26 may be made of a metal such as aluminum, stainless steel, etc.

The cap assembly 30 may include a cap plate 31 that covers the opening of the case 26, the first terminal 21, which protrudes out of the cap plate 31 to be electrically coupled to the positive electrode 11, and the second terminal 22, which protrudes out of the cap plate 31 to be electrically coupled to the negative electrode 12.

The cap plate 31 may be formed as an elongated plate in one direction, and may be combined to the opening of the case 26. A sealing cap 38 may be provided in an electrolyte injection opening 32 that is formed in the cap plate 31, and a vent plate 39, in which a notch 39a to be ruptured at a predetermined pressure is formed, may be provided in a vent hole 34 that is formed in the cap plate 31. The first and second terminals 21 and 22 may be provided to protrude above the cap plate 31.

The first terminal 21 may be electrically coupled to the positive electrode 11 via a first current collecting member 41, and the second terminal 22 may be electrically coupled to the negative electrode 12 via a second current collecting member 42.

The first terminal 21 may have a quadrangular plate shape. The first terminal 21 may be electrically coupled to the positive electrode 11 via a first connecting terminal 251 bonded to the first current collecting member 41.

A first sealing gasket 591 that provides a seal between the first terminal 21 and the cap plate 31 may be inserted into a hole that the first terminal 21 penetrates. A lower insulating member 43 that supports the first current collecting member 41 may be provided under the cap plate 31.

A cap connecting member 58 that electrically couples the first terminal 21 and the cap plate 31 may be provided under the first terminal 21. Accordingly, the cap plate and the case 26 may be electrically coupled with the positive electrode.

The second terminal 22 may have a quadrangular plate shape. The second terminal 22 may be electrically coupled to the negative electrode 12 via a second connecting terminal 252 bonded to the second current collecting member 42. The second connecting terminal 252 may penetrate the cap plate 31 and the second terminal 22 such that an upper end of the second connecting terminal 252 is fixed to the second terminal 22. The first connecting terminal 251 combined to the first terminal 21 and the second connecting terminal 252 combined to the second terminal 22 have the same structure.

A second sealing gasket 592 that provides a seal between the second terminal 22 and the cap plate 31 may be inserted into a hole that the second terminal 22 penetrates. A lower insulating member 43 may be provided under the cap plate 31 to insulate the second terminal 22 and the second current collecting member 42 from the cap plate 31. An upper insulating member 54 may be provided between the second terminal 22 and the cap plate 31 for insulation. The upper insulating member 54 may extend to a short-circuit hole 37, and an opening 56a is formed in the upper insulating member 54 to be connected to the short-circuit hole 37 while being positioned thereabove.

The cap assembly 30 may include a short-circuit member 56 that short-circuits the positive electrode 11 and the negative electrode 12. The short-circuit member 56 may be electrically coupled to the cap plate 31 and may be deformed to cause a short-circuit when internal pressure of the rechargeable battery 101 exceeds a predetermined limit.

The short-circuit hole 37 may be formed in the cap plate 31. The short-circuit member 56 may be disposed between the upper insulating member 54 and the cap plate 31 in the short-circuit hole 37. The short-circuit member 56 may include a curved portion that is downwardly convex in an arc shape, and an edge portion that is formed at an outer edge of the curved portion and fixed to the cap plate 31. The short-circuit member 56 may be positioned under the opening described above.

The short-circuit member 56 may be positioned between the second terminal 22 and the vent hole 34, and may be disposed adjacent to the second terminal 22.

Referring back to FIG. 1, the fuse member 200 may be electrically coupled to the second electrode terminal 22 of the second rechargeable battery 120, and the second drawn-out tab 73 may be electrically coupled to the fuse member 200.

The fuse member 200 may include a first pad 201a that contacts and overlaps the second electrode terminal 22, a second pad 201b that overlaps the short-circuit member 56, and a connecting bridge 204 that is positioned between the first pad 201a and the second pad 201b. The fuse member 200 may include at least one fuse.

Fuses 203a and 203b, which have relatively smaller widths than the other parts of the fuse member 200, may be positioned between the first pad 201a and the connecting bridge 204 and between the second pad 201b and the connecting bridge 204.

The first and second pads 201a and 201b may be formed to be larger in area than the fuses 203a and 203b to increase an overlapping area. The second pad 201b may be formed to be larger in area than the short-circuit hole through which the short-circuit member 56 is exposed, such that a border line of the short-circuit hole is positioned inside a border line of the second pad 201b.

The fuses 203a and 203b may have smaller widths and smaller cross-sections than the other parts of the fuse member 200. When an overcurrent flows due to malfunctioning of the rechargeable battery, the fuses 203a and 203b may be more easily melted and cut off compared to the other parts of the fuse member 200.

As shown in FIG. 4, a protrusion 77 that protrudes toward the short-circuit hole 37 where the short-circuit member 56 is provided, may be formed at one surface of the second pad 201b. The protrusion 77 may have a pillar shape with a circular or polygonal cross-section, and may have the same planar shape as that of the short-circuit hole 37. A diameter of the protrusion 77 may be formed smaller than a diameter of the short-circuit hole 37 such that the protrusion 77 is insertable into the short-circuit hole 37. When the protrusion 77 is formed as such, the short-circuit member 56 may contact the protrusion 77 when the short-circuit member 56 is inversely deformed, such that a contact area may be increased compared to when the short-circuit member 56 contacts the second pad 201b.

As described above, when the fuse member is provided in the rechargeable battery module as in the current exemplary embodiment, when the fuse is cut off and thus no current flows even if malfunctioning of the rechargeable battery included in the rechargeable battery module occurs, the rechargeable batteries included in the battery module may be prevented from being extensively damaged, as will be described in detail with reference to FIGS. 5 and 6.

Figure 5:
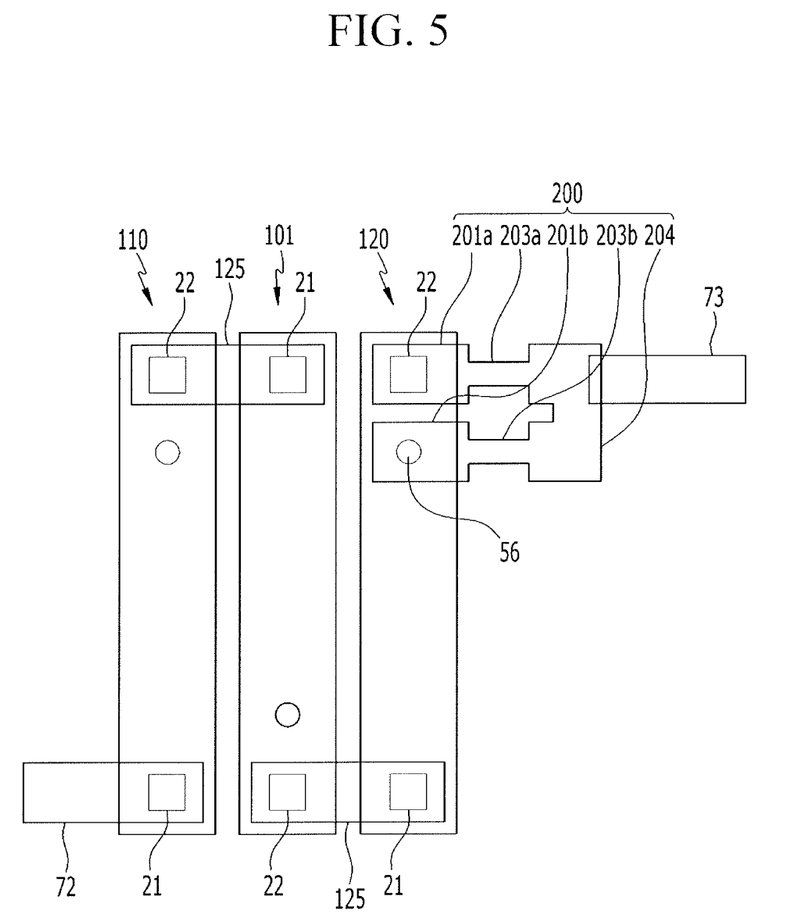
FIGS. 5 and 6 illustrate schematic top plan views of a battery module depicting an operation of the fuse member included in the battery module according to the exemplary embodiment.
Figure 6:
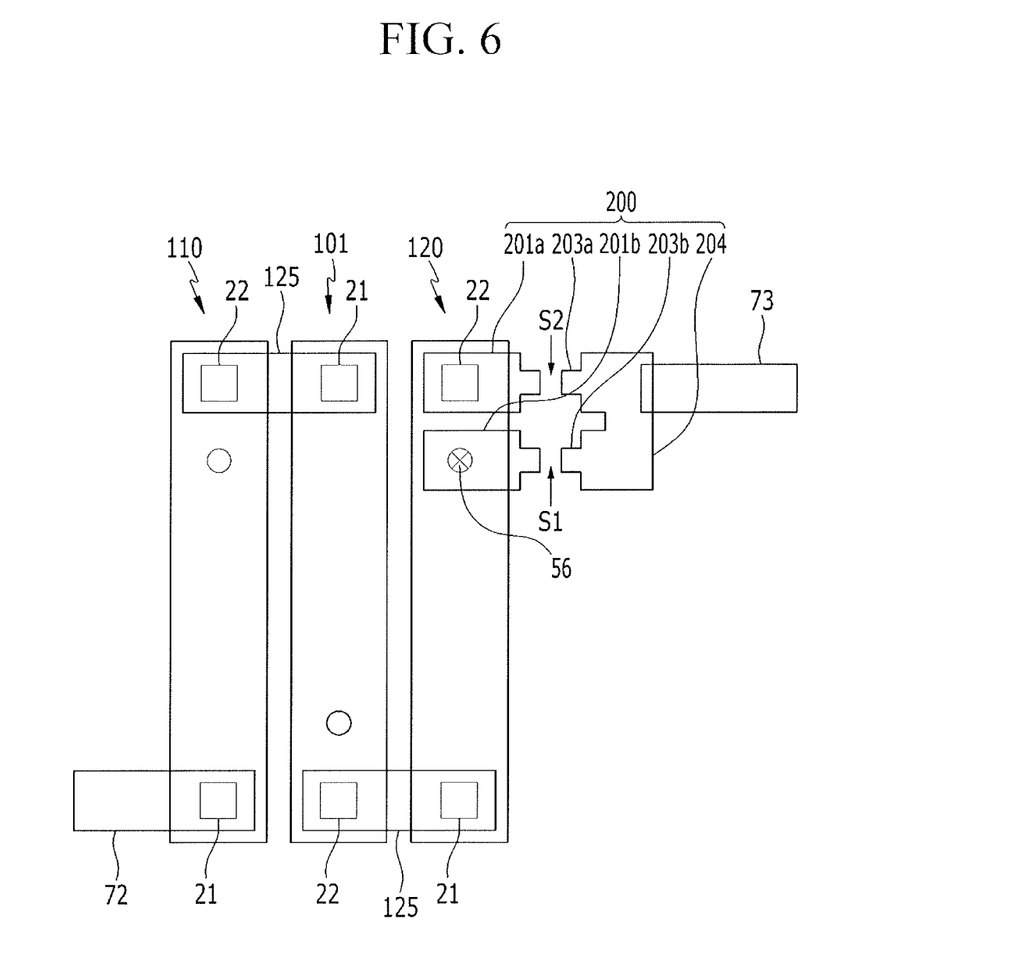

FIGS. 5 and 6 illustrate schematic top plan views of a battery module depicting an operation of the fuse member included in the battery module according to the exemplary embodiment.

The rechargeable battery module of FIGS. 5 and 6 may include a plurality of rechargeable batteries, and a module in which three rechargeable batteries are connected in series will be exemplarily described. In this case, FIG. 5 illustrates a top plan view of the rechargeable battery module before an abnormal reaction occurs, and FIG. 6 illustrates a top plan view of the rechargeable battery module after the abnormal reaction occurs.

First, as shown in FIG. 5, first terminals 21 and second terminals 22 of three rechargeable batteries 110, 101, and 120 may be connected in series by connecting members 125. In order to sequentially connect the first terminals 21 with the second terminals 22 by using the connecting members 125, the rechargeable batteries may be arranged such that their first terminals and their second terminals are alternately disposed with respect to each other.

The first terminal 21 of the first rechargeable battery 110 may be connected to a first drawn-out tab 72, and the second terminal 22 of the third rechargeable battery 120 may be connected to a second drawn-out tab 73.

In this case, the second drawn-out tab 73 may be connected to the second terminal 22 of the third rechargeable battery 120 via a fuse member 200. For example, a first pad 201a of the fuse member 200 may contact and be connected to the second terminal 22, a second pad 201b may be provided to overlap a short-circuit member 56, and the second drawn-out tab 73 may be connected to a connecting bridge 204.

Subsequently, due to various causes inside or outside the rechargeable battery module, an abnormal reaction may occur inside the rechargeable battery.

When the abnormal reaction occurs inside the rechargeable battery, gas may be generated inside the rechargeable battery, causing the internal pressure of the rechargeable battery to increase. When the internal pressure of the rechargeable battery increases above a predetermined pressure, a curved portion of the short-circuit member 56 may be convexly deformed in an opposite direction to contact a bottom surface of the second pad 201b of the fuse member 200, thereby causing a short-circuit.

The short-circuit member 56 may be fixed to a sidewall of a short-circuit hole 37 formed in the case 26 and may be connected to a positive electrode via the case 26 contacting the first terminal 21, which serves as the positive electrode. The fuse member 200 may be connected to the negative electrode while being connected to the second terminal 22.

Accordingly, the short-circuit may occur when the short-circuit member 56 of the third rechargeable battery 120 is inversely deformed and then contacts the second pad 201b thereabove. When the short-circuit is generated as such, a short-circuit current corresponding to several tens of times the amount of a rated current flows, and the short-circuit current is transmitted to the fuse member 200 via the second pad 201b.

Fuses 203a and 203b of the fuse member 200 may be cut off when a predetermined amount of current flows, as shown in FIG. 6 (S1 and S2). Accordingly, when a high current such as the short-circuit current flows, a current flow is cut off such that no current flows. When the flow of the short-circuit current is cut off due to the fuse being cut off, the rechargeable batteries inside the module may be prevented from being extensively damaged by the short-circuit current. Accordingly, when the short-circuit current is cut off by the fuse, except for the short-circuited third rechargeable battery 120 at the outmost side, a current may be generated via the first and second rechargeable batteries 110 and 101.

As in the exemplary embodiment, when the fuse member 200 is provided in the rechargeable battery inside the battery module, which is positioned at either of opposite ends of the battery module that are electrically coupled, the flow of the short-circuit current can be prevented by using the fuse member when the abnormal reaction occurs in the rechargeable battery connected to the fuse member.

In addition, after removing the rechargeable battery 120 in which the abnormal reaction occurs, the second terminal 22 of the rechargeable battery 101 neighboring the rechargeable battery 120 can be coupled to the second drawn-out tab 73, thereby generating a current from the rest of the rechargeable batteries 110 and 101. The second drawn-out tab 73 may be coupled to the second terminal 22 of the rechargeable battery 101 via a new fuse member.

By way of summation and review, in a battery module including a plurality of rechargeable batteries that are electrically connected, when an event such as overcharge, penetration, or an external short circuit occurs in any one unit battery of the rechargeable batteries, an overcurrent may flow from the unit battery in which the event occurs even to the last-connected unit battery, thereby damaging some of the unit batteries in which no event occurs.

In contrast, embodiments provide a battery module in which stability and safety against overcharging is improved by easily cutting off a flow of a short-circuit current. Accordingly, a battery module according to embodiments has improved safety against an abnormal operation of a rechargeable battery, and a battery module according to embodiments may prevent a plurality of rechargeable batteries from being extensively damaged. According to embodiments, a battery module with minimized damage and improved stability may be provided by using a fuse member to easily cut off the flow of a short-circuit current Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope as set forth in the following claims.

What is claimed is:

1. A battery module, comprising:
    a first rechargeable battery and a second rechargeable battery electrically coupled in series to each other, the first rechargeable battery and the second rechargeable battery each including:
        a first electrode terminal and a second electrode terminal,
        a case that accommodates an electrode assembly that performs charging and discharging operations;
        a cap plate combined to an opening of the case, wherein the first electrode terminal is electrically connected a positive electrode of the electrode assembly and to the cap plate and the second electrode terminal is electrically connected to a negative electrode of the electrode assembly and electrically isolated from the cap plate; and
        a short-circuit member that deforms when an internal pressure of one of the first rechargeable battery and second rechargeable battery exceeds a predetermined pressure, the short-circuit member being located in a short-circuit hole that penetrates through the cap plate, the short-circuit hole being between the second electrode terminal and a vent hole of the cap plate such that every portion of the short-circuit hole is closer to the vent hole than every portion of the second electrode terminal;
        a fuse member outside the case, the fuse member including a first pad overlapping, contacting, and electrically coupled to the second electrode terminal of the second rechargeable battery, and a second pad coupled to the cap plate and overlapping the short-circuit member of the second rechargeable battery, the second pad being electrically insulated from the cap plate;
        a first drawn-out tab connected to the first electrode terminal of the first rechargeable battery, and a second drawn-out tab connected to the fuse member; and
        a plurality of fuses between the first pad and the second pad and the second drawn-out tab outside the case, wherein widths of the fuses are smaller than widths of the first and second pads,
    wherein the short-circuit member is deformable when an internal pressure inside the case exceeds a reference pressure such that in a state in which the short-circuit member is deformed, the short-circuit member physically contacts the second pad to electrically connect the second pad with the cap plate, short-circuiting a first electrode and a second electrode of the electrode assembly through the fuse member.

2. The battery module as claimed in claim 1, wherein the short-circuit member further includes an edge portion that is fixed inside the short-circuit hole.

3. The battery module as claimed in claim 2, wherein a border of the short-circuit hole is located within a boundary defined by a border of the second pad.

4. The battery module as claimed in claim 2, wherein the second pad further includes a protrusion that protrudes toward an inside of the short-circuit hole such that in a state where the short-circuit member is deformed, physical contact of the short-circuit member with the second pad is at the protrusion.

5. The battery module as claimed in claim 1, wherein the positive electrode, the negative electrode, and a separator are spirally wound based on a winding axis.

* * * * *